(12) United States Patent
Peterson et al.

(10) Patent No.: US 10,132,639 B2
(45) Date of Patent: Nov. 20, 2018

(54) SYSTEMS AND METHODS TO PROVIDE UPDATES AT FIRST DEVICE OF LOCATION OF SECOND DEVICE AS THE DEVICES TRAVEL TO A DESTINATION

(71) Applicant: Lenovo (Singapore) Pte. Ltd., New Tech Park (SG)

(72) Inventors: Nathan J. Peterson, Oxford, NC (US); Arnold S. Weksler, Raleigh, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 33 days.

(21) Appl. No.: 15/477,482

(22) Filed: Apr. 3, 2017

(65) Prior Publication Data

US 2018/0283885 A1    Oct. 4, 2018

(51) Int. Cl.
*G01C 21/34* (2006.01)
*G01C 21/36* (2006.01)

(52) U.S. Cl.
CPC ....... *G01C 21/3438* (2013.01); *G01C 21/343* (2013.01); *G01C 21/3476* (2013.01); *G01C 21/362* (2013.01); *G01C 21/3626* (2013.01); *G01C 21/3673* (2013.01)

(58) Field of Classification Search
CPC ............ G01C 21/3438; G01C 21/3673; G01C 21/3626; G01C 21/3476; G01C 21/343; G01C 21/362; G01S 19/01; G05D 1/0287; G05D 1/0293
See application file for complete search history.

(56) References Cited

U.S. PATENT DOCUMENTS

| | | | | |
|---|---|---|---|---|
| 6,895,329 B1* | 5/2005 | Wolfson | ............. | G01C 21/3415 340/988 |
| 8,554,243 B2* | 10/2013 | Klassen | ................. | G01C 21/20 455/456.1 |
| 9,141,112 B1* | 9/2015 | Loo | ....................... | G05D 1/0293 |
| 2009/0319172 A1* | 12/2009 | Almeida | ................ | G01C 21/20 701/533 |
| 2013/0245939 A1* | 9/2013 | Chang | ................ | G01C 21/3438 701/527 |
| 2014/0005941 A1* | 1/2014 | Paek | .................. | G01C 21/3438 701/533 |
| 2014/0278044 A1* | 9/2014 | Jacobs | .................... | G06F 17/00 701/300 |
| 2014/0282093 A1* | 9/2014 | Burke | ................... | H04W 4/029 715/753 |

* cited by examiner

*Primary Examiner* — Michael J Zanelli
(74) *Attorney, Agent, or Firm* — John L. Rogitz; John M. Rogitz

(57) ABSTRACT

In one aspect, a first device includes a processor, a display accessible to the processor, and storage accessible to the processor. The storage bears instructions executable by the processor to provide directions to a destination on the display, repetitively receive location information that pertains to a location of a second device traveling to the destination, and provide updates on the location of the second device on the display with the directions.

19 Claims, 9 Drawing Sheets

SYSTEMS AND METHODS TO PROVIDE UPDATES AT FIRST DEVICE OF LOCATION OF SECOND DEVICE AS THE DEVICES TRAVEL TO A DESTINATION

BACKGROUND

As recognized herein, software applications and devices can provide a user with driving directions to a destination. However, sometimes a user and a travel companion are traveling to the destination in different vehicles but still might want to follow each other to the destination. But, as recognized herein, if the user and travel companion are separated from eye sight from each other, those applications and devices do not provide a way for the user to know where the travel companion might be while traveling to the destination or if the travel companion has stopped while en route to the location. There are currently no adequate solutions to the foregoing computer-related problem.

SUMMARY

Accordingly, in one aspect a first device includes a processor, a display accessible to the processor, and storage accessible to the processor. The storage bears instructions executable by the processor to provide directions to a destination on the display, repetitively receive location information that pertains to a location of a second device traveling to the destination, and provide updates on the location of the second device on the display with the directions.

In another aspect, a method includes repetitively receiving, at a first device, location information pertaining to a location of a second device while the second device traverses a geographic area. The method also includes providing, on a display accessible to the first device, directions to follow the second device while the second device traverses the geographic area.

In yet another aspect, a computer readable storage medium that is not a transitory signal comprises instructions executable by a processor of a first device to transmit data to a second device that indicates a destination of the first device and to transmit data to the second device that provides updates of a current location of the first device as the first device travels to the destination.

The details of present principles, both as to their structure and operation, can best be understood in reference to the accompanying drawings, in which like reference numerals refer to like parts, and in which:

DETAILED DESCRIPTION

Figure 1:
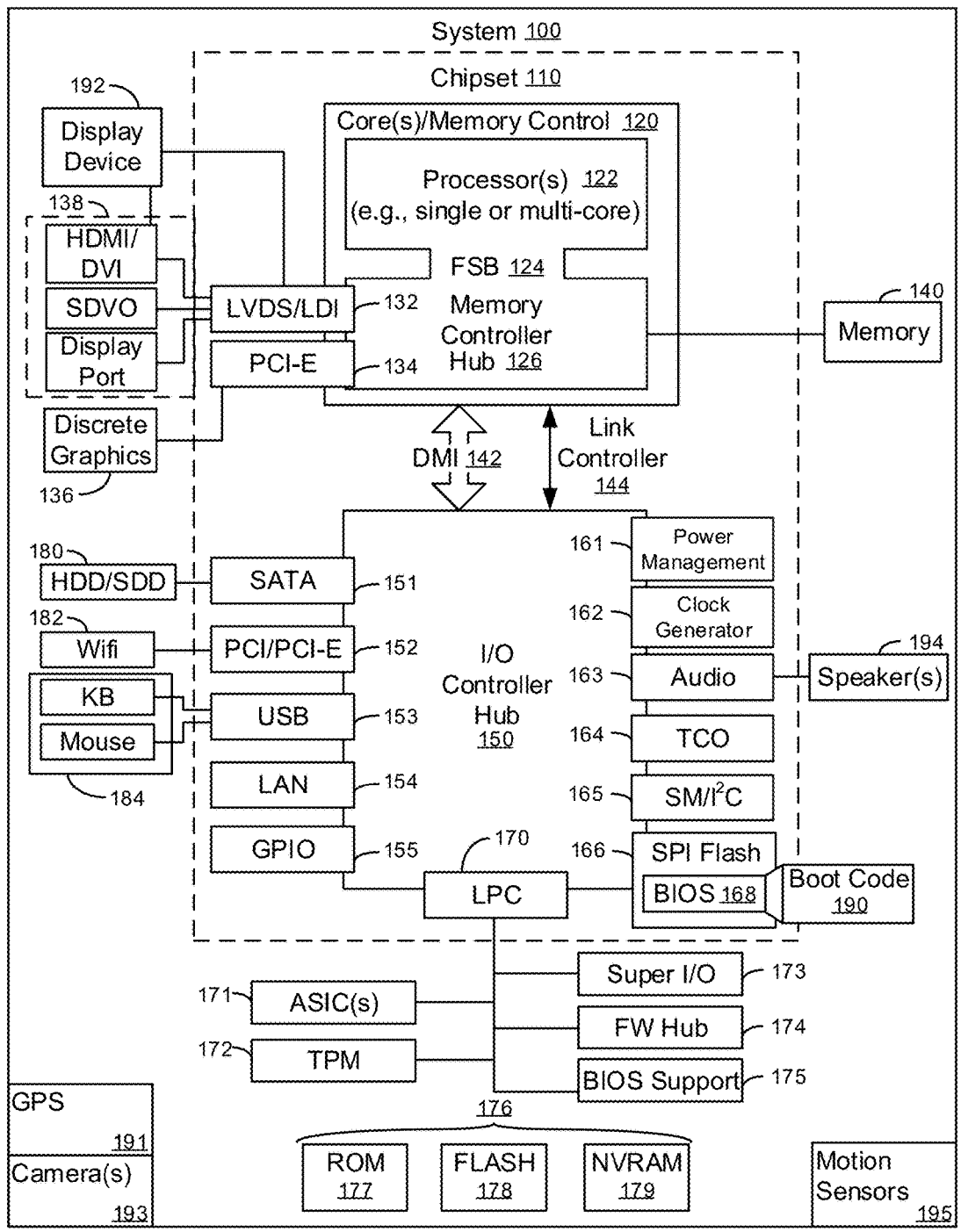
FIG. 1 is a block diagram of an example system in accordance with present principles.

Disclosed herein are embodiments for a "follow that car" mode for GPS navigation and the providing of directions. This may be desirable, for example, where family members are traveling to a common destination from a common origination point, but in different vehicles. The devices disclosed herein may provide location updates to each other repetitively such as at periodic, predefined intervals so that if one vehicle makes a stop (such as at a rest area) or a turn, the other vehicle may receive location information related to that so that the other person in the other vehicle may be advised of such. Furthermore, the lead vehicle may alert the other vehicle(s) of lane changes so that the people in the vehicles behind may be notified that the lead vehicle may be, for example, about to exit the road on which they are traveling if the lead vehicle moves over into the right-most lane. Other information may also be presented related to the other vehicles that are traveling with a given vehicle, such as the distance and travel time between the vehicles and any traffic accidents that one of the vehicles might be involved in.

Furthermore, it is to be understood that although the vehicles disclosed herein are described as having drivers, in some embodiments the vehicles may be automated vehicles and/or so-called driverless vehicles having only non-drivers.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, in some embodiments the system 100 may include a GPS transceiver 191 that is configured to receive geographic position information from at least one satellite and provide the information to the processor 122. However, it is to be understood that another suitable position receiver other than a GPS receiver may be used in accordance with present principles to determine the location of the system 100.

Further, the system 100 may include one or more cameras 193 that gather image and provides the images and other input related thereto to the processor 122. The cameras 193 may be thermal imaging cameras, digital cameras such as webcams, three-dimensional (3D) cameras, and/or other cameras otherwise integrated into the system 100 and controllable by the processor 122 to gather pictures/images and/or video.

Additionally, the system 100 may include one or more motion sensors 195 such as a gyroscope that senses and/or measures the orientation of the system 100 and provides input related thereto to the processor 122, and an accelerometer that senses acceleration and/or movement of the system 100 and provides input related thereto to the processor 122.

It is to be understood that an example client device or other machine/computer may include fewer or more features than shown on the system 100 of FIG. 1. In any case, it is to be understood at least based on the foregoing that the system 100 is configured to undertake present principles.

Figure 2:
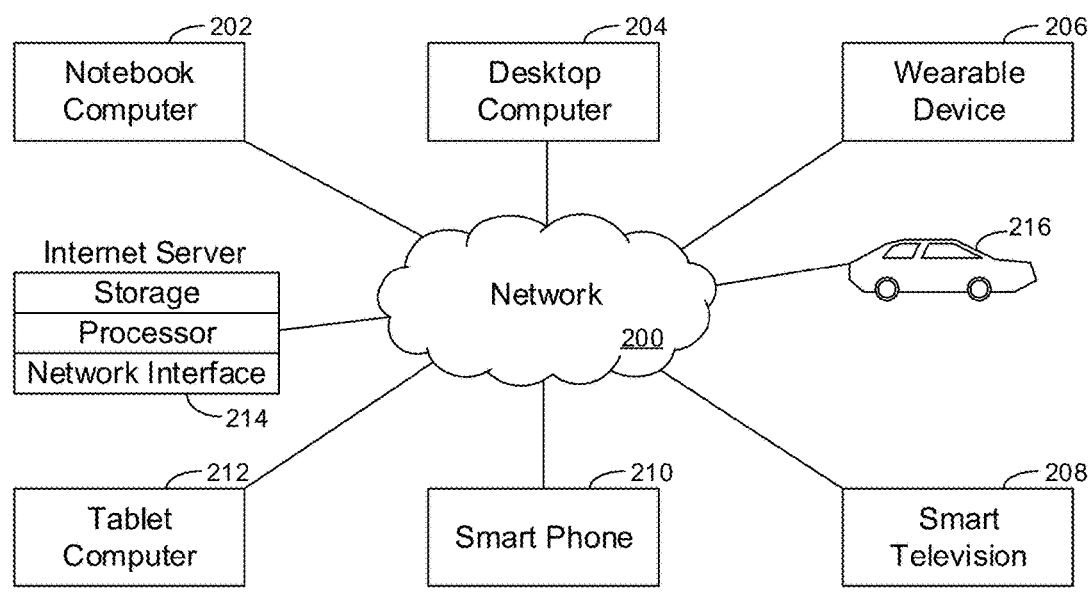
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 are configured to communicate with each other over the network 200 to undertake present principles.

Figure 3:
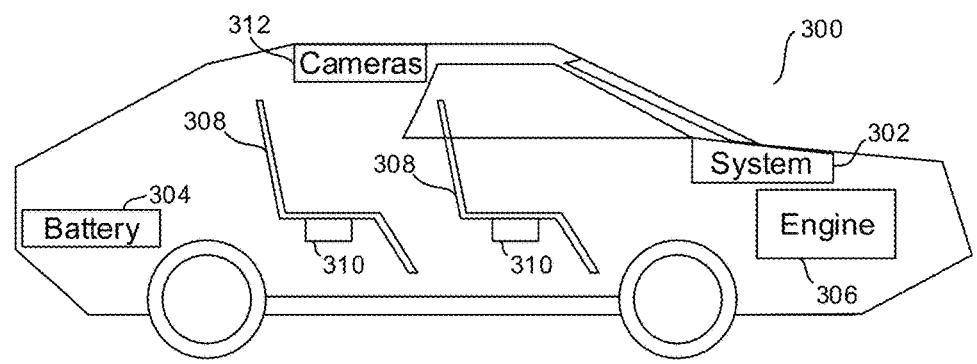
FIG. 3 is a block diagram of an example vehicle in accordance with present principles.

FIG. 3 shows an example vehicle 300 that may be similar to the vehicle 216 referenced above. The vehicle 300 may include a system 302 that may be similar to the system 100 described above and include components such as those set forth above in reference to the system 100. It is to be understood that the system 302 may be in communication with other components of the vehicle 300 to receive input therefrom in accordance with present principles, such as being in communication with a speedometer of the vehicle 300, a transmission of the vehicle 300, etc. The vehicle 300 may include a battery/battery pack 304 that provides power to the vehicle 300 and, in some embodiments, the system 302 may communicate with and control the battery 304. The vehicle 300 may also include an internal combustion engine 306 that also provides power to propel the vehicle 300 and, in some embodiments, the system 302 may also communicate with and control the internal combustion engine 306. The engine 306 may be a fossil fuels-powered engine, such as a gasoline-powered engine or a diesel-powered engine.

Also in some embodiments, the vehicle 300 may include plural seats or chairs 308 in which a driver and passengers in the vehicle 300 may sit. Each seat or chair 308 may include a weight sensor 310 that senses the weight of a person sitting in the respective seat 308 in which the respective sensor 310 is disposed and provides input pertaining to the weight of a passenger to the system 302 in accordance with the disclosure herein. Additionally, in some embodiments the vehicle 300 may include one or more on-board cameras 312 disposed on various parts of the vehicle 300 to gather images of the vehicle's surroundings (such as surrounding lanes as the vehicle travels down a highway) and to provide the images to the system 302 also in accordance with the disclosure below.

Still further, though not shown for clarity, it is to be understood that the vehicle 300 may include brakes for slowing and stopping the vehicle, and the brakes may communicate data pertaining to their operation to the system 302 so that the vehicle 300 may indicate to other devices that the brakes have been engaged. Even further, the vehicle 300 may include an tachometer and a speedometer to respectively monitor revolutions per minute (RPMs) of the vehicle's engine and the speed of the vehicle in accordance with present principles, with the tachometer and speedometer one or both of controlled by the system 302 and providing data to the system 302 in accordance with present principles.

Figure 4:
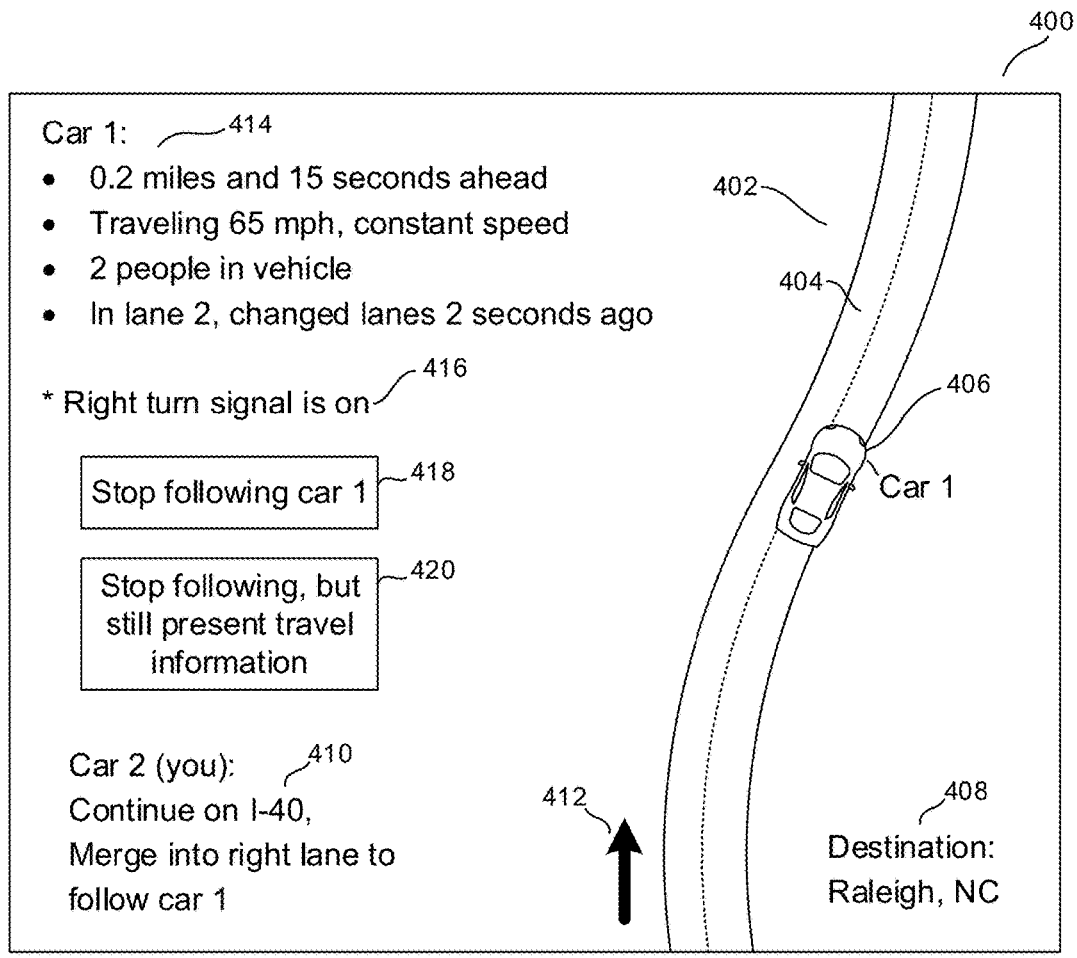
FIGS. 4 and 6-15 are example user interfaces (UIs) in accordance with present principles.

Now in reference to FIG. 4, it shows an example user interface (UI) 400 presentable on the display of a device undertaking present principles, such as the display of a vehicle (referred to as "Car Two") and/or its on-board computing system, or the display of a smartphone inside the vehicle, so that a user of Car Two may follow directions to follow a vehicle ahead of it ("Car One") and to follow directions to a common destination of Car One and Car Two while following Car One. The UI 400 may include a graphic 402 of a throughway 404 such as a road, street, highway, freeway, boulevard, or any other surface on which a vehicle may travel. A graphic 406 of Car One is also shown and may be updated as Car One travels along the throughway 404.

The UI 400 may also show an indication 408 of the common destination for Car One and Car Two. As indicated above, Car Two is understood to be the device controlling the display on which the UI 400 is presented. Car Two is to be further understood to be following Car One to the destination. Information and directions 410 pertaining to Car One may thus be presented on the UI 400. As examples, the information and directions 410 may include information pertaining to the current speed of Car One, information on a lane of the throughway 404 on which Car One is traveling, directions to travel to the common destination, and separate directions to follow Car One as Car One traverses the throughway 404 and travels to the destination over a geographic area. As shown in FIG. 4, the directions 410 may include directions on how to follow Car One (e.g., continue traveling a particular highway but merge from a left lane into a right lane in which Car One is currently located) and an arrow graphic 412 indicating a direction in which Car Two is to travel.

The UI 400 of FIG. 4 also shows information 414 on Car One that may have been wirelessly received by Car Two from a number of sources, including from Car One and/or a device associated therewith. As shown, the information 414 may include, for example, the distance between Car One and Car Two and an estimated time to travel for Car Two to reach a current location of Car One. The information 414 may also include a speed at which Car One is traveling and whether that speed is constant (as shown in FIG. 4) or changing (accelerating or decelerating).

Still further, the information 414 may include a number of people in Car One. This may be determined, for example, based on input from weight sensors disposed in or under the seats disposed in Car One. The input may then be used by Car One to determine a number of people in the vehicle and the number of people may then be transmitted to Car Two, and/or the weight sensor input itself may be transmitted to Car Two for Car Two to make such a determination.

FIG. 4 also shows that the information 414 may also include information pertaining to a lane of the throughway 404 in which Car One is currently located, as well as information pertaining to a most-recent lane change made by Car One and when/how long ago that lane change occurred. Even further, note that the information 414 may include an alert 416 that Car One has activated a turn signal to turn a particular direction. In the example shown, Car One has activated a turn signal to turn right. Still other information may be included, though not shown in FIG. 4. For example, when Car One places its transmission in reverse, information may be presented on the UI 400 that Car One has been placed in and/or is traveling in reverse.

It is to be understood that the information 414 may be repetitively (e.g., periodically) or continually updated as Car One and Car Two traverse the geographic area to their destination as such information is received from Car One or another device relaying the information to Car Two.

Still in reference to FIG. 4, the UI 400 may also include a selector 418 that is selectable to configure the device to stop following Car One. For example, selector 418 may be selected to configure the device associated with Car Two to stop providing directions to follow Car One and to stop providing other information associated with Car One such as any of the information 414, but to still provide directions to the common destination. A selector 420 may also be presented on the UI 400. The selector 420 may be selected to configure the device associated with Car Two to stop providing directions to follow Car One but to still present information related to Car One, such as the information 414.

Figure 5:
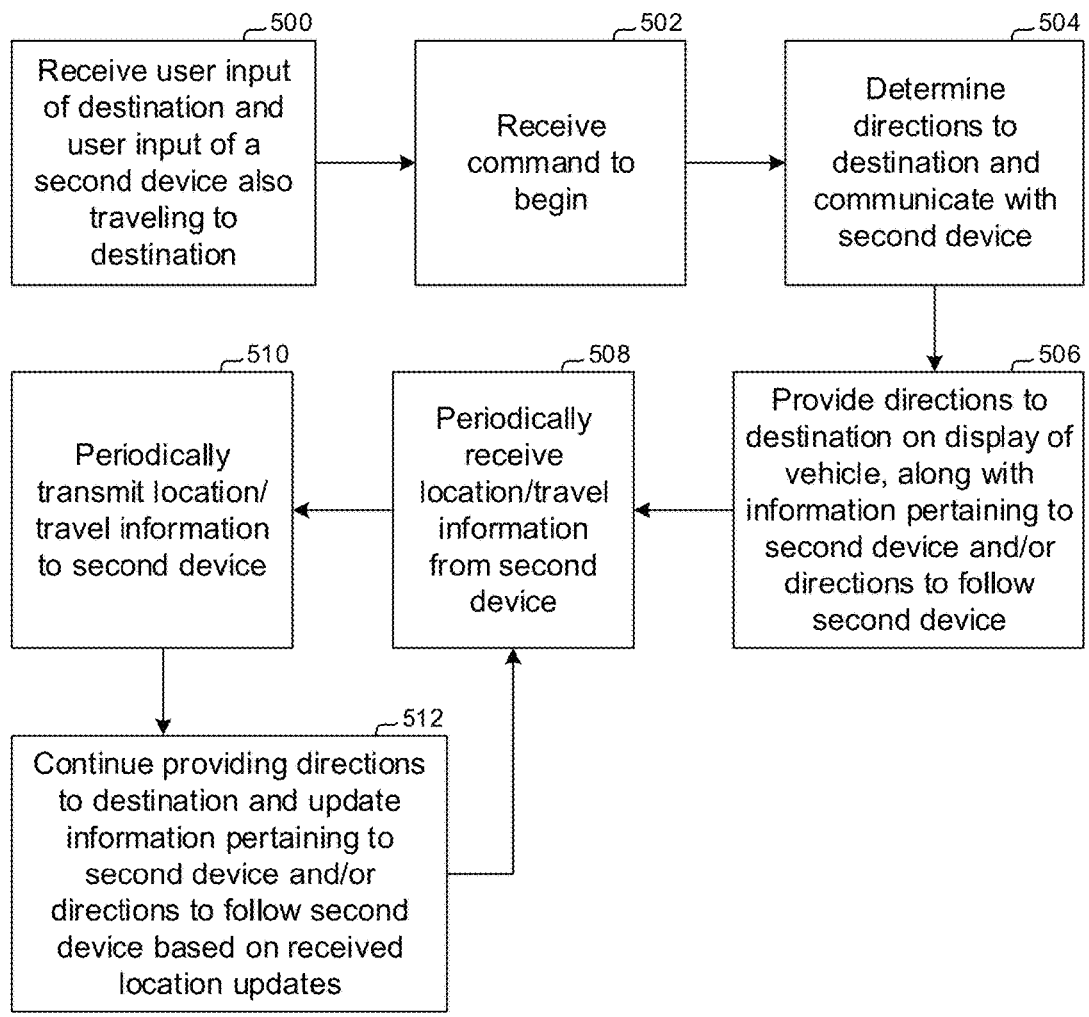
FIG. 5 is a flow chart of an example algorithm in accordance with present principles.

Continuing the detailed description in reference to FIG. 5, it shows example logic in accordance with present principles that may be executed by a device such as the system 100, vehicle 300, and/or either or both of Car One and Car Two described herein. The device executing the logic of FIG. 5 will be referred to below as the "vehicle" for simplicity, though it is to be understood that in some embodiments the device executing the logic of FIG. 5 may be a personal device in communication with such a vehicle, such as the smart phone of a passenger seated in the vehicle.

Beginning at block 500, the vehicle may receive user input indicating a destination to which to travel along with user input indicating a second device that is also to travel to the destination. Input indicating the destination may be, for example, input directed to a soft keyboard presented on the vehicle's display of a particular address, or audible input detected by a microphone on the vehicle that describes a particular place which the vehicle may then identify based on, e.g., an Internet search. Input indicating the second device may be, for example, a telephone number associated with the second device, a social networking friend of a user of the vehicle that is associated with the second device, and/or an identification number associated with the second device.

The input indicating the second device may also be, for example, input to "connect" to the second device, which then causes a caravan request to be wirelessly transmitted from the vehicle to the second device for acceptance by the second device. More on this request and acceptance will be described below in reference to FIGS. 14 and 15.

From block 500, the logic of FIG. 5 may then proceed to block 502. At block 502 the vehicle may receive a command to begin providing directions to the common destination and information pertaining to the second device. The command may be received, for example, by providing audible input to "begin" or by receiving input to a touch-enabled display of the vehicle to begin.

Thereafter, the logic may move to block 504 where the vehicle may determine directions to the common destination, such as using road, maps and/or direction-providing software and input from a GPS transceiver on the vehicle to identify and track the location of the vehicle. Also at block 504, the vehicle may communicate with the second device to receive information pertaining to the second device, such as the information 414 described above. The communication may be, for example, wireless communication using a cellular data network operated by a cellular service provider. Other forms of wireless communication may also be used, such as Wi-Fi direct or even Bluetooth communication when the vehicle and second device are within Bluetooth communication range of each other.

The logic of FIG. 5 may then proceed to block 506 where, based on execution of the road, maps and/or direction-providing software, the vehicle may output directions to the destination on the vehicle's display (e.g., using GPS coordinates from the vehicle's GPS transceiver), along with information received from the second device and/or directions to follow the second device. The directions to follow the second device may be identified and provided based on data from the second device itself such as turns and lane changes the second device has made and that the vehicle should make, GPS transceiver data from the second device used to identify the directions to follow the second device based on the second device's GPS coordinates (e.g., using the road, maps and/or direction-providing software), and even input from on board cameras on the second device that face away from the second device to identify lanes in which the second device is traveling and when the second device crosses from one lane to another (as may be identified using object recognition software).

From block 506 the logic may then move to block 508. At block 508 the vehicle may repetitively and/or continually receive location updates and/or travel information from the second device, such as updated GPS coordinates pertaining to a current location of the second device and updates on information such as the information 414 discussed above. For example, input from the second device's speedometer and passenger weight sensors may be transmitted from the second device to the vehicle, though it is to be further understood that in some embodiments the vehicle may itself identify the speed of the second device based on GPS coordinate updates provided by the second device to itself calculate the second device's rate of speed over time. Still other data may be received from the second device at block 508, such as an indication that a turn signal has been activated as identified by the second device responsive to its activation and which is then transmitted to the vehicle.

The logic may then continue from block 508 to block 510. At block 510 the vehicle may repetitively and/or continually identify and transmit its own location updates and travel information to the second device, similar to how the second device provided updates to the vehicle as described above. This may be performed so that that the second device, even if ahead of the vehicle in relation to the common destination as they both travel to it, may also present travel information and travel progress related to the vehicle so that a user of the second device may view it on a display of the second device. Additionally or alternatively, such updates may be provided responsive to a predefined occurrence being identified, such as the vehicle activating a turn signal, stopping, making a turn, changing lanes, etc.

After block 510 the logic may proceed to block 512. At block 512 the vehicle may, based on and responsive to the updates and information received at block 508, continue to provide (audibly and/or on the vehicle's display) directions to the common destination, along with other information received from the second device and/or directions to follow the second device. From block 512 the logic may then revert to block 508 and proceed therefrom.

FIGS. 6-12 will now be described. It is to be understood that although the user interfaces of these figures do not show certain information and selectors described above, such as much of the information 414 described above and directions 410 described above, these sorts of items may still be presented on the UIs of FIGS. 6-12 and have merely been omitted for simplicity. It is to also be understood that these figures will be discussed from the perspective of Car Two referenced above.

Figure 6:
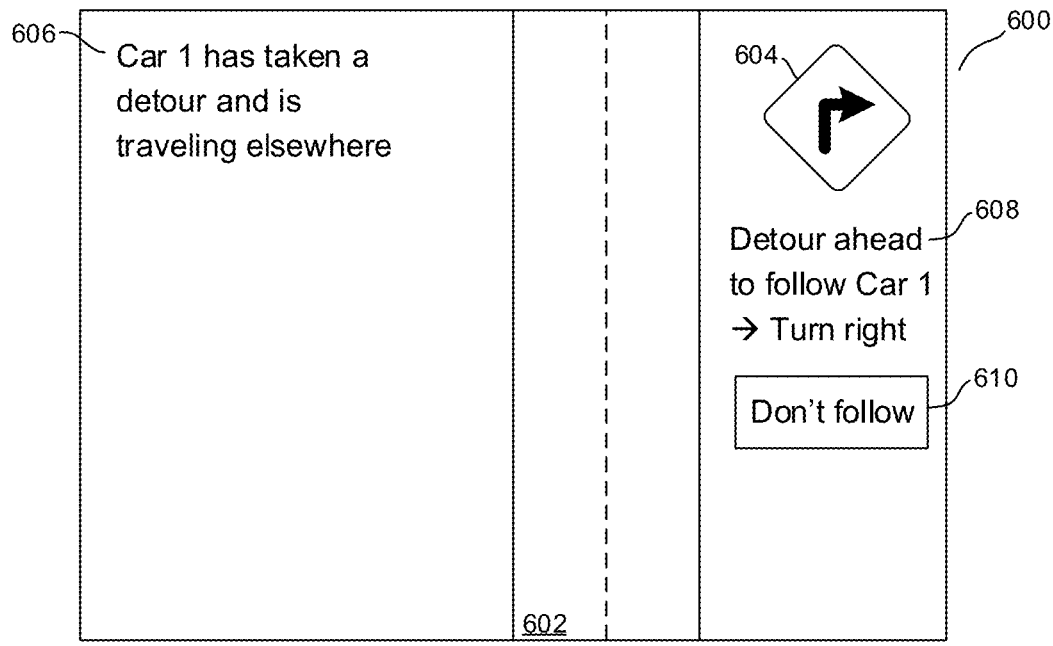

First describing the UI 600 shown in FIG. 6, is shows a throughway 602. Car One is not shown in FIG. 6 because it is relatively far ahead of Car Two as they travel to their common destination. However, a detour graphic 604 is shown to indicate that an upcoming right turn should be made by Car Two to detour from the common destination to follow Car One as Car One travels elsewhere. Also, an alert 606 may be presented that Car One has taken a detour and is traveling elsewhere, as well as directions 608 to follow Car One as it detours. A selector 610 may also be presented that is selectable, e.g., based on touch input to a display on which the UI 600 is presented, to configure Car Two to no longer provide directions to follow Car One but still continue to provide directions to the common destination.

Figure 7:
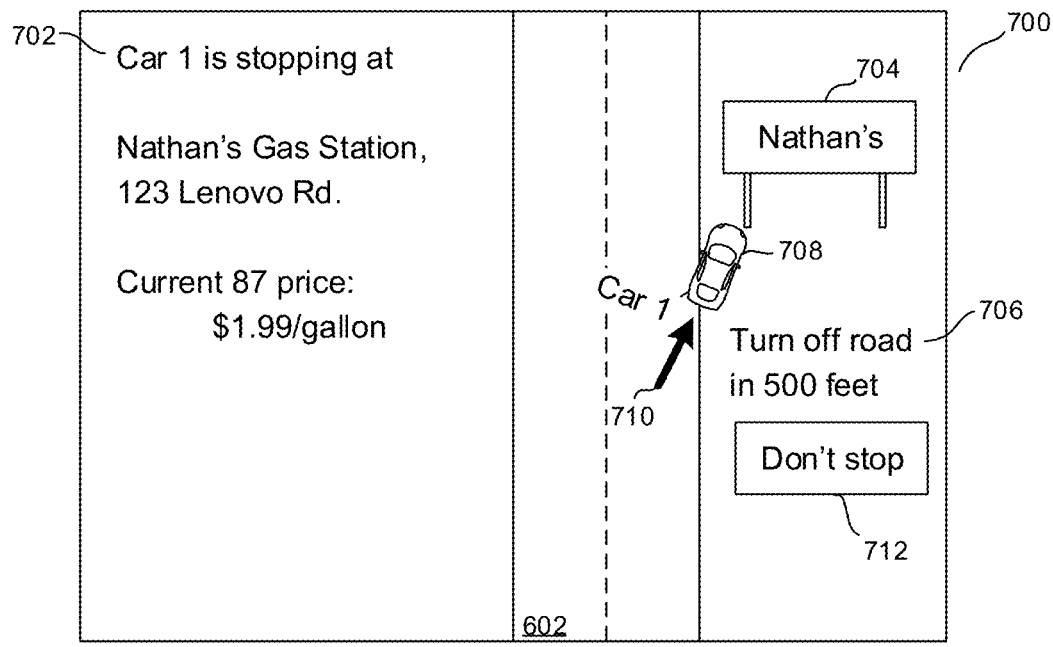

FIG. 7 shows an update to the UI 600, now designated UI 700. As may be appreciated from FIG. 7, UI 700 presents an alert 702 that Car One, while traveling to the common destination, is stopping at a gas station named Nathan's Gas Station, with a graphic 704 representing the gas station being presented on the UI 700 as well. Information pertaining to the gas station may be received from Car One and/or identified by Car Two based on current GPS coordinates received from Car One and identification using Car Two's road, maps and/or direction-providing software of an establishment associated with where Car One is stopping or subsequently has stopped. Once the establishment has been identified, still other information may be identified as presented as part of the alert 702. The information may be identified using an Internet search, a particular application such as a yellow pages application or gas station price application, etc. In the example shown, the alert 702 indicates an address of the gas station and a current price at which it is selling eighty seven octane gasoline.

As may also be appreciated from FIG. 7, directions 706 to follow Car One may also be provided, along with a graphic 708 of Car One and an arrow 710 indicating a direction in which it is traveling. A selector 712 may also be presented that is selectable to configure Car Two to no longer provide directions to follow Car One but still continue to provide directions to the common destination. However, it is to be understood that as long as Car One is stopped at the gas station, and absent selection of the selector 712, Car Two may continue to update the UI 700 to provide directions for Car Two to travel to the gas station to meet Car One.

Figure 8:
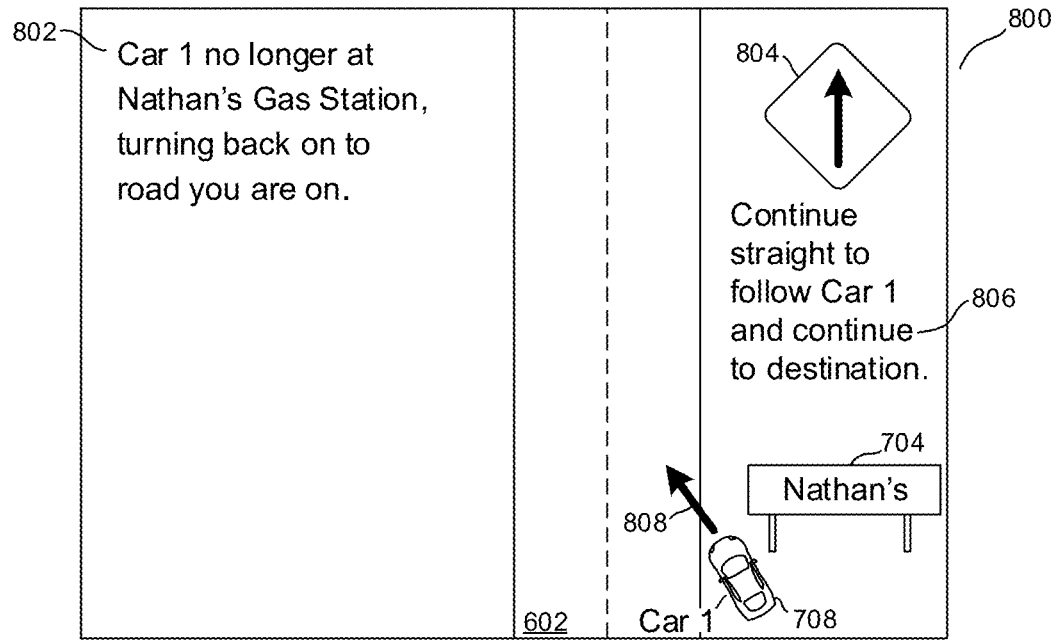

FIG. 8 shows an updated UI 800 along with an alert 802 that Car One is no longer stopped at the gas station and indicating that Car One is turning back onto the same throughway on which Car Two is traveling. An arrow 804 may also be presented that indicates a direction (in this case, straight ahead) in which Car Two should continue to travel to follow Car One and continue on to the common destination, along with textual directions 806 indicating the same. An arrow 808 may also be presented on the UI 800 that indicates a direction in which Car One is traveling, in this case from Nathan's Gas Station back onto the throughway 602 being traversed by Car One and Car Two.

Figure 9:
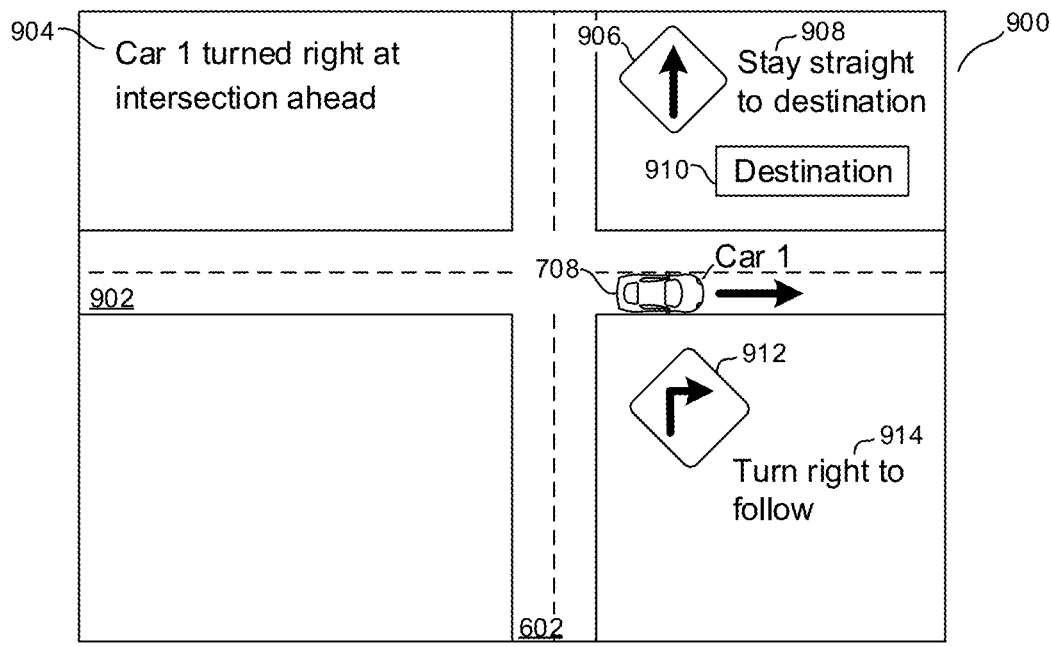

Now in reference to FIG. 9, it shows a UI 900 that may be presented on a display of Car Two when, for example, Car Two is following Car One but Car One has made a turn from traversing the throughway 602 to traversing a different throughway 902 intersecting throughway 602. The UI 900 thus includes an alert 904 that Car One has made a right turn at the intersection and onto the throughway 902. A graphic 906 and directions 908 are also shown that indicate that Car Two should continuing traveling straight ahead on throughway 602 to travel to the destination. A selector 910 is juxtaposed adjacent to the graphic 906 and directions 908 and is selectable to configure Car Two to no longer provide directions to follow Car One but still continue to provide directions to the common destination. As also shown in FIG. 9, the UI 900 may also present a graphic 912 and directions 914 that indicate that Car Two should turn right at the intersection to continue following Car One instead of continuing to travel to the common destination.

Figure 10:
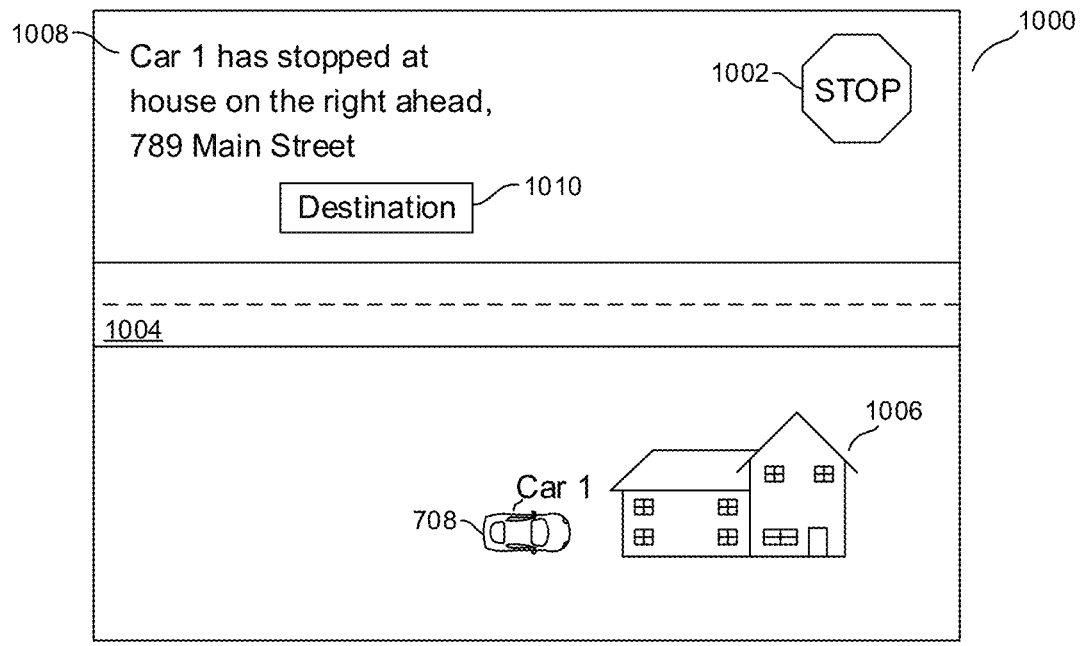

FIG. 10 shows another example scenario via a UI 1000 that may be presented on the display of Car Two. The UI 1000 includes a stop graphic 1000 indicating that Car One has stopped while traversing a throughway 1004 at a house 1006 on the throughway 1004. The UI 1000 may also include an alert 1008 that Car One has stopped at the house 1006, with the alert 1008 further indicating a location of the house. In this example, the indication of the location includes both an address of the house and a location of the house in relation to a current position of Car Two (e.g., the house is "on the right ahead"). A selector 1010 may also be presented that is selectable to configure Car Two to no longer provide directions to follow Car One but still continue to provide directions to the common destination.

Figure 11:
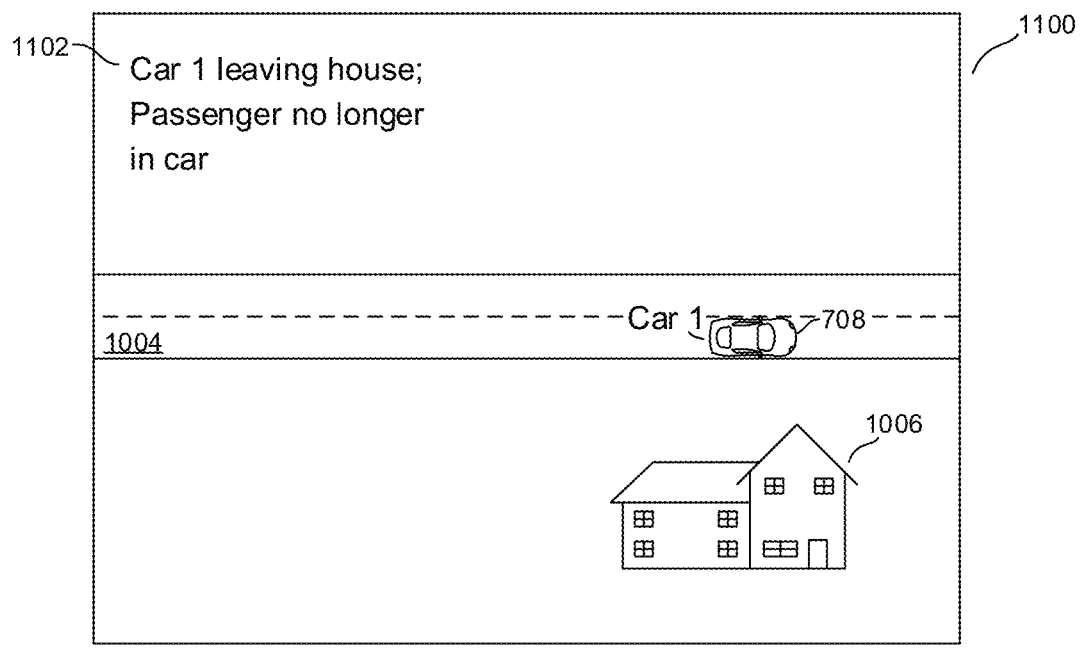

As shown in FIG. 11, once Car One begins leaving the house 1006, an updated UI 1100 may be presented. The UI 1102 may present an updated alert 1102 that Car One is now leaving the house 1006. The alert 1102 may also indicate, for example, that a passenger of Car One that was previously sensed as being in Car One (e.g., using a weight sensor) is no longer disposed within Car One, such as may be the case if the passenger were dropped off at the house 1006. The driver of Car Two may thus be updated that a passenger of Car One has been dropped off while Car One and Car Two continue on to the common destination.

Figure 12:
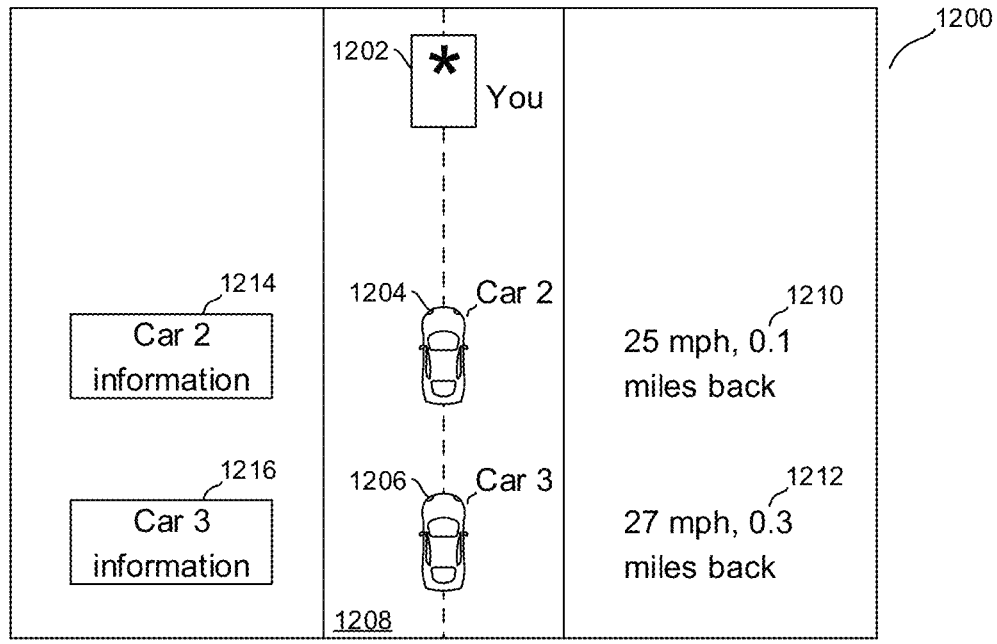

Now in reference to FIG. 12, another example UI 1200 is shown. In contrast to FIGS. 4 and 6-11, the UI 1200 is understood to be a UI presented on the display of Car One rather than Car Two. The UI 1200 may be presented so that, for example, although Car One is ahead of Car Two and another Car Three also traveling to the common destination, the driver of Car One may still be able to receive updates on the locations of Cars Two and Three as they all caravan to the common destination.

The UI 1200 shows a graphic 1202 indicating a current location of Car One itself A graphic 1204 of Car Two and a graphic 1206 of Car Three may also be shown on a representation 1206 of a throughway 1208 as they traverse the throughway over a geographic area along with Car One. Information 1210 associated with Car Two may be presented, such as the current speed of Car Two and a distance of Car Two from Car One. Similarly, information 1212 associated with Car Three may be presented, such as the current speed of Car Three and a distance of Car Three from Car One. Also note that selectors 1214 and 1216 respectively associated with Cars Two and Three may also be presented that are each selectable (e.g., based on touch input) to configure Car One to present further information on the respective car to which the selector pertains, such as a current lane in which the Car Two might be traveling and how many people are in Car Two.

Figure 13:
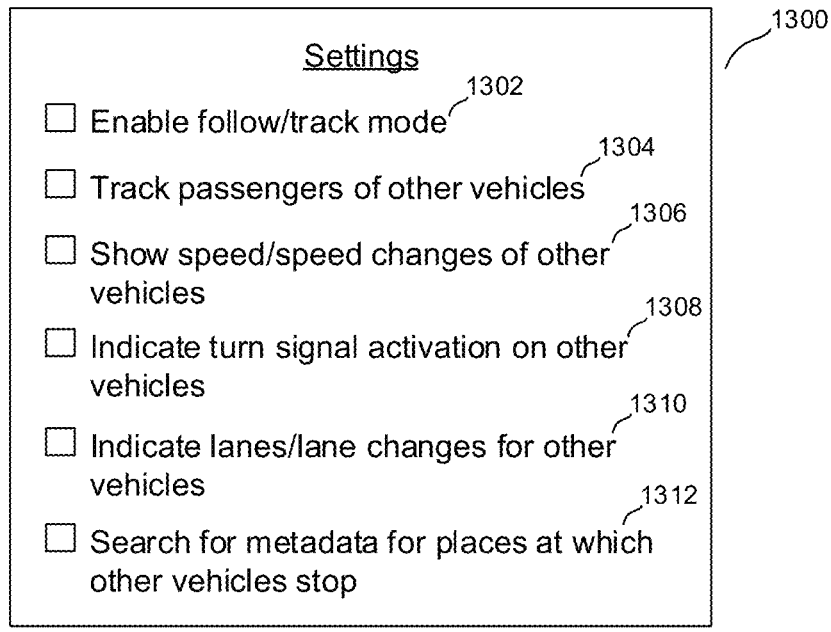

Continuing the detailed description in reference to FIG. 13, a UI 1300 is shown that may be presented on the display of a device undertaking present principles for configuring settings of the device. For example, the UI 1300 may be presented on the display of either of Car One or Car Two. It is to be understood that each option to be discussed below in relation to FIG. 13 may be selected using the respective check box shown adjacent to it. Furthermore, it is to be understood that without enablement of a given one of the options 1302-1312 by selecting it, the device may not perform the associated function but still, for example, provide directions to a destination.

In any case, the UI 1300 shows a first option 1302 that is selectable to enable the device to follow and/or track other vehicles in accordance with present principles while traveling to a common destination of the device and other vehicles. A second option 1304 may also be presented that is selectable to enable the device to track and present information related to the number of passengers in the other vehicles. A third option 1306 may be also be presented on the UI 1300 that is selectable to enable the device to track and present information related to the speed and speed changes of the other vehicles.

The UI 1300 may also include an option 1308 that is selectable to enable the device to track and present information related to turn signals activated at the other vehicles. Still further, an option 1310 may be presented that is selectable to enable the device to track and present information related to current lanes in which the other vehicles are traveling and lane changes made by the other vehicles while traveling. Also shown is an option 1312 that is selectable to enable the device to search for metadata for places at which the other vehicles might stop while traveling to a common destination.

Figure 14:
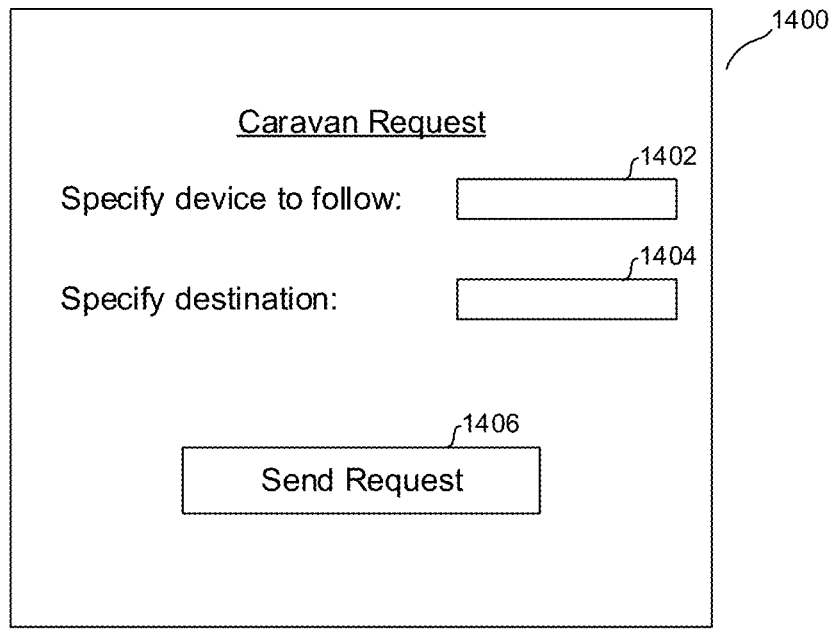
Figure 15:
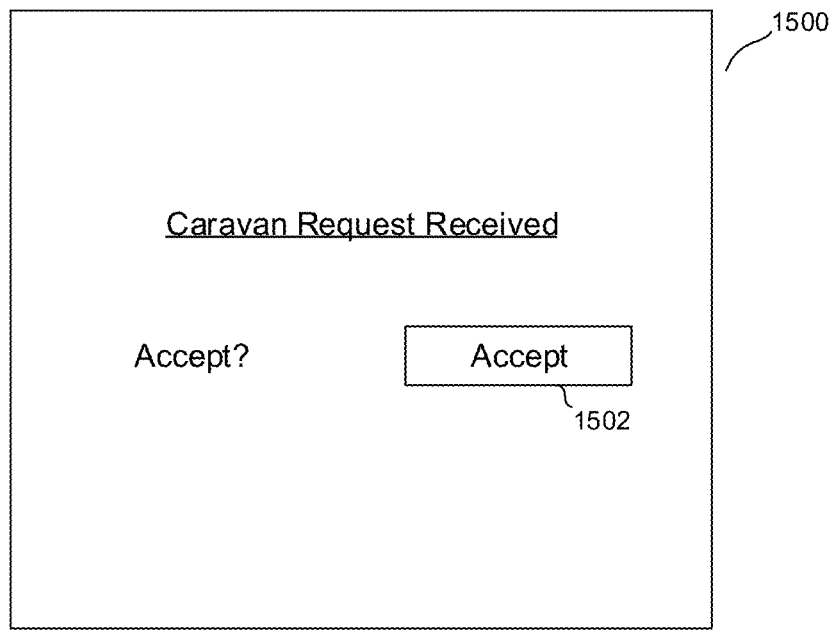

Continuing the detailed description in reference to FIGS. 14 and 15, example UIs 1400 and 1500 are respectively shown. These UIs may be presented to respectively issue and authorize a caravan request between two devices that have users that would like to travel together to a common destination and track each other's progress to the common destination. To issue a caravan request from one device to another device, the UI 1400 of FIG. 14 may be presented. An input box 1402 may be presented at which the user may enter a phone number or other identifier (e.g., email address) for transmission of a request to a device associated with the phone number or other identifier. The request may be transmitted, for example via short message service (SMS) text message, via email, etc. Another input box 1404 may also be presented at which the user may enter a destination to which the two devices are to caravan. Additionally, a selector 1406 may be presented where, responsive to selection of the selector 1406 once appropriate input has been provided to input boxes 1402 and 1404, the caravan request may be transmitted to the other device, with the caravan request indicating the destination input to input box 1404.

The other device may then receive the caravan request and present the UI 1500 shown in FIG. 15. Should the user of that device wish to accept the request, the user may select selector 1502 to initiate an exchange of information, such as location information, between the two devices as described herein so that the two devices may track each other as they travel to a common destination.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
a display accessible to the at least one processor; and
storage accessible to the at least one processor and bearing instructions executable by the at least one processor to:
provide, on the display, directions to a destination;
receive, repetitively, location information pertaining to a current location of a second device while traveling to the destination;
provide, on the display and with the directions, updates on the current location of the second device;
indicate, on the display and based on at least some of the location information that is received, that the second device has stopped at a particular location; and provide, on the display, directions to the particular location as long as the second device is stopped at the particular location.

2. The first device of claim 1, wherein the instructions are executable by the at least one processor to:
   indicate, on the display and based on at least some of the location information that is received, that the second device has taken a detour from traveling to the destination.

3. The first device of claim 1, wherein the instructions are executable by the at least one processor to:
   indicate, on the display and based on at least some of the location information that is received, that the second device has stopped traveling to the destination and is traveling elsewhere; and
   provide, on the display, directions to follow the second device as it travels elsewhere.

4. The first device of claim 1, wherein the instructions are executable by the at least one processor to:
   provide, on the display and responsive to a determination that the second device is no longer stopped at the particular location, directions to the destination and additional updates on the current location of the second device.

5. The first device of claim 1, wherein the instructions are executable by the at least one processor to:
   indicate, on the display, an establishment associated with the particular location.

6. The first device of claim 1, wherein the instructions are executable by the at least one processor to:
   indicate, on the display, information associated with the particular location.

7. The first device of claim 1, wherein the instructions are executable by the at least one processor to:
   indicate, on the display and based on at least some of the location information that is received, a lane in which the second device is currently located.

8. The first device of claim 1, wherein the instructions are executable by the at least one processor to:
   indicate, on the display and based on at least some of the location information that is received, a turn made by the second device.

9. A method, comprising:
   repetitively receiving, at a first device, location information pertaining to a location of a second device while the second device traverses a geographic area;
   providing, on a display accessible to the first device, directions to follow the second device while the second device traverses the geographic area; and
   indicating, on the display and based on at least some of the location information that is received, a lane in which the second device is currently located.

10. The method of claim 9, wherein the directions are first directions, and wherein the method comprises:
    providing, on the display and while providing at least a portion of the first directions, second directions to a destination of the first device and the second device.

11. The method of claim 9, comprising:
    presenting, on the display and based on at least some of the location information that is received, a graphic that indicates that the second device has stopped traversing the geographic area.

12. The method of claim 9, comprising:
    presenting, on the display and based on at least some of the location information that is received, a graphic that indicates that the second device has made a lane change on a throughway while traversing the geographic area.

13. The method of claim 9, comprising:
    presenting, on the display and based on at least some of the location information that is received, an indication of a distance between the first device and the second device; and
    updating, on the display, the indication of the distance as the first device and the second device traverse the geographic area.

14. The method of claim 9, comprising:
    presenting, on the display and based on at least some of the location information that is received, an indication of an estimated time to travel for the first device to reach a current location of the second device; and
    updating, on the display, the indication of the estimated time to travel as the first device and the second device traverse the geographic area.

15. The method of claim 9, comprising:
    transmitting, responsive to determining that the first device is stopping, data to the second device that the first device is stopping.

16. The method of claim 9, comprising:
    presenting, on the display, a graphical user interface (GUI), the GUI comprising a setting that is selectable by a user to enable the first device to provide directions to follow other devices based on location information that is received and that pertains to locations of the other devices.

17. A computer readable storage medium that is not a transitory signal, the computer readable storage medium comprising instructions executable by at least one processor to:
    transmit, to a second device, data that indicates a destination of a first device;
    transmit, to the second device, data that provides updates of a current location of the first device as the first device travels to the destination; and
    responsive to a determination that the first device has changed lanes while traversing a throughway, transmit data to the second device that indicates that the first device has changed lanes and that indicates a lane of the throughway to which the first device has changed.

18. The computer readable storage medium of claim 17, wherein the instructions are executable by the at least one processor to:
    responsive to a determination that the first device has stopped traveling to the destination, transmit data to the second device that indicates that the first device has stopped traveling to the destination.

19. The computer readable storage medium of claim 17, wherein the instructions are executable by the at least one processor to:
    receive data pertaining to location updates as the second device follows the first device to the destination; and
    present, on a display accessible to the first device and based on the data, information pertaining to the location updates along with information pertaining to a current distance between the first device and the second device and information pertaining to a current speed of the second device.

* * * * *